United States Patent
Okabe et al.

(10) Patent No.: US 6,875,482 B2
(45) Date of Patent: Apr. 5, 2005

(54) LIQUID CRYSTAL COMPOSITION AND LIQUID CRYSTAL DISPLAY ELEMENT

(75) Inventors: Eiji Okabe, Ichihara (JP); Yoshitaka Tomi, Ichihara (JP)

(73) Assignees: Chisso Petrochemical Corporation, Tokyo (JP); Chisso Corporation, Osaka (JP)

(*) Notice: Subject to any disclaimer, the term of this patent is extended or adjusted under 35 U.S.C. 154(b) by 0 days.

(21) Appl. No.: 10/726,653

(22) Filed: Dec. 4, 2003

(65) Prior Publication Data

US 2004/0108489 A1 Jun. 10, 2004

(30) Foreign Application Priority Data

Dec. 4, 2002 (JP) .................................... 2002-352263

(51) Int. Cl.[7] ........................ C09K 19/30; C09K 19/12; C09K 19/20
(52) U.S. Cl. .............. 428/1.1; 252/299.63; 252/299.66; 252/299.67
(58) Field of Search ...................... 428/1.1; 252/299.63, 252/299.66, 299.67, 299.61

(56) References Cited

U.S. PATENT DOCUMENTS

| | | | | |
|---|---|---|---|---|
| 5,961,881 A | * | 10/1999 | Andou et al. | 252/299.63 |
| 6,007,740 A | * | 12/1999 | Andou et al. | 252/299.63 |
| 6,187,223 B1 | * | 2/2001 | Andou et al. | 252/299.63 |
| 6,315,922 B1 | * | 11/2001 | Takeshita et al. | 252/299.61 |
| 6,325,949 B1 | * | 12/2001 | Takeshita et al. | 252/299.63 |
| 6,497,929 B1 | * | 12/2002 | Miyairi et al. | 428/1.1 |
| 6,572,938 B2 | * | 6/2003 | Yanai et al. | 428/1.1 |
| 6,592,951 B2 | * | 7/2003 | Heckmeier et al. | 428/1.1 |
| 6,753,046 B2 | * | 6/2004 | Manabe et al. | 428/1.1 |
| 2002/0066887 A1 | * | 6/2002 | Yanai et a. | 428/1.1 |

OTHER PUBLICATIONS

Patent Abstracts of Japan, 10–204016, Aug. 1998.

Patent Abstracts of Japan, 10–204436, Aug. 1998.

Patent Abstracts of Japan, 2001–288470, Oct. 2001.

* cited by examiner

*Primary Examiner*—Shean C. Wu
(74) *Attorney, Agent, or Firm*—Wenderoth, Lind & Ponack, L.L.P.

(57) ABSTRACT

The present invention provides a liquid crystal composition comprising at least one compound selected from the compounds represented by each of formulas (1) to (5) as set forth in the specification. The invention further provides a liquid crystal display element comprising the composition.

24 Claims, No Drawings

LIQUID CRYSTAL COMPOSITION AND LIQUID CRYSTAL DISPLAY ELEMENT

BACKGROUND OF THE INVENTION

1. Field of the Invention

The present invention relates to a liquid crystal composition suitable for use mainly in an active matrix (AM) element and an AM element comprising the composition.

2. Related Art

A liquid crystal display element is classified, based on an operating mode of a liquid crystal, into phase change (PC), twisted nematic (TN), super twisted nematic (STN), electrically controlled birefringence (ECB), optically compensated bend (OCB), in-plane switching (IPS), vertical alignment and the like. It is classified into passive matrix (PM) and active matrix (AM) based on a driving mode. PM is classified into static, multiplex and the like, and AM is classified into thin filter transistor (TFT), metal insular metal (MIM) and the like. TFT is classified into amorphous silicon and polycrystal silicon. The latter is classified into a high temperature type and a low temperature type according to the production process. A liquid crystal display element is classified, based on a light source, into a refection type utilizing a natural light, a transmission type utilizing a backlight and a semi-transmission type utilizing both.

These elements comprise a liquid crystal composition having suitable characteristics. To improve the general characteristics of the composition can lead to the production of an AM element having good general characteristics. The general characteristics of the composition are related with those of an AM element as summarized in Table 1. The general characteristics of the composition shall be explained further based on an AM element on the market. The temperature range of a nematic phase is related with the temperature range wherein the element can be used. Desirable upper temperature limit of a nematic phase is 70° C. or more and a desirable lower temperature limit is −20° C. or less. The viscosity of the composition correlates with the response time of the element. A short response time is desirable for displaying a moving image. Accordingly, the composition desirably has low viscosity, and low viscosity at low temperature is more desirable.

TABLE 1

General characteristics of a liquid crystal composition and an AM element

| No | General Characteristics of the Composition | General Characteristics of an AM Element |
|---|---|---|
| 1 | Wide temperature range of nematic phase | Available in wide temperature range |
| 2 | Low in viscosity[1] | Short in response time |
| 3 | Suitable optical anisotropy | High in contrast ratio |
| 4 | Low in threshold voltage | Low in electric power consumption and high in contrast ratio |
| 5 | High in specific resistance | High in voltage holding ratio and high in contrast ratio |

[1] The liquid crystal composition can be injected into a cell in a short time.

Optical anisotropy of the composition correlates with the contrast ratio of the element. To attain a maximum contrast ratio of a transmission type AM element, a product (Δn·d) of the optical anisotropy (Δn) of the composition and the cell gap (d) of the element should be designed to approximately 0.45 μm. Accordingly, the optical anisotropy of the composition is primarily in the range of 0.08 to 0.12. On the other hand, in the case of reflection type and semi-transmission type AM elements, Δn·d is approximately 0.25 μm and the cell gap is 2.0 to 4.0 μm in consideration of the response time and the process technology. Accordingly, the optical anisotropy of the composition is primarily in the range of 0.06 to 0.075. Low threshold voltage of the composition contributes to low electric power consumption and high contrast ratio in the element. Accordingly, low threshold voltage is desirable. High specific resistance of the composition contributes to high voltage holding ratio and high contrast ratio of the element. Accordingly, the composition having high specific resistance in the initial stage is desirable. Further, it is desirable that the composition still has high specific resistance even after a long-term use.

A liquid crystal composition having a small optical anisotropy, low threshold voltage and high specific resistance is especially desirable for a reflection type or semi-transmission type AM element so that it is driven with low electric power consumption and displayed at a high contrast ratio. The conventional liquid crystal compositions are disclosed in the following patent documents; JP-A 10-204016/1998, JP-A 10-204436/1998 and JP-A 288470/2001

SUMMARY OF THE INVENTION

The present invention comprises the following items A, B and C.

A. A liquid crystal composition comprising at least one compound selected from the compounds represented by formula (1), at least one compound selected from the compounds represented by formula (2), at least one compound selected from the compounds represented by formula (3), at least one compound selected from the compounds represented by formula (4) and at least one compound selected from the compounds represented by formula (5):

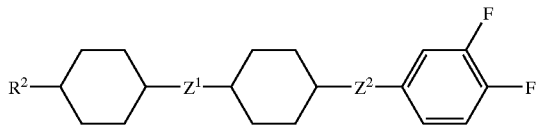

(1)

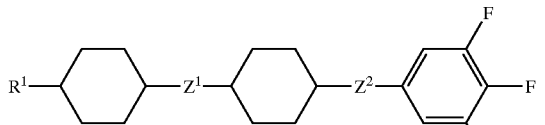

(2)

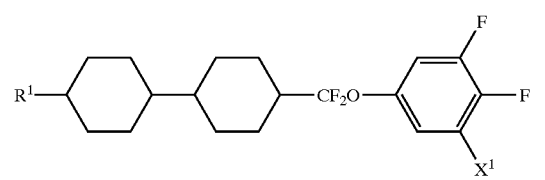

(3)

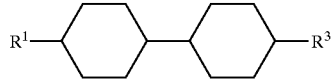

(4)

-continued

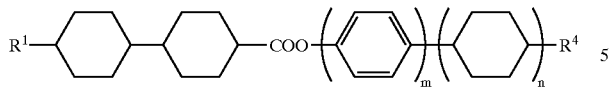
(5)

wherein R¹ represents alkyl; R² represents alkyl or alkenyl; R³ represents alkyl, alkoxyl, alkenyl or —CF₃, where any hydrogen in alkenyl may be replaced by fluorine; R⁴ represents alkyl or fluorine; X¹ represents hydrogen or fluorine; Z¹ and Z² each independently represent a single bond or —(CH₂)₂—; m and n each independently represents 0 or 1, and the sum of m and n is 1 or 2.

B. A liquid crystal composition which comprises at least one compound selected from the compounds represented by formula (1) as a first component, at least one compound selected from the compounds represented by formula (7) as a second component, and at least one compound selected from the compounds represented by formulas (4) and (5) as a third component:

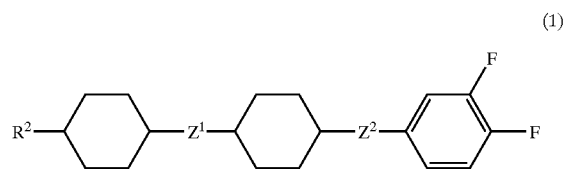
(1)

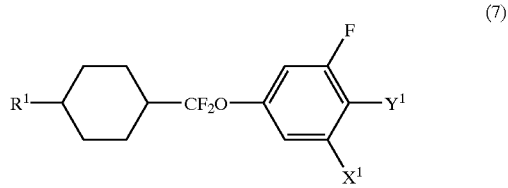
(7)

(4)

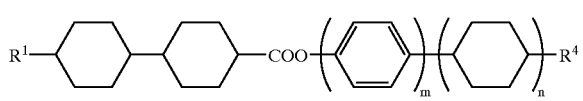
(5)

wherein R¹ represents alkyl; R² represents alkyl or alkenyl; R³ represents alkyl, alkoxyl, alkenyl or —CF₃, where any hydrogen in alkenyl may be replaced by fluorine; R⁴ represents alkyl or fluorine; X¹ represents hydrogen or fluorine; Y¹ represents fluorine or —OCF₃; Z¹ and Z² each independently represent a single bond or —(CH₂)₂—; m and n each independently represents 0 or 1, and the sum of m and n is 1 or 2.

C. A liquid crystal display element comprising the liquid crystal composition described above.

DETAILED DESCRIPTION

An object of the present invention is to provide a liquid crystal composition which can satisfy plurality of the characteristics such as wide temperature range of a nematic phase, low viscosity, small optical anisotropy, low threshold voltage and high specific resistance. Another object is to provide a liquid crystal composition having plurality of these characteristics well balanced. A further object is to provide a liquid crystal display element comprising such a composition and having an especially high voltage holding ratio.

The present invention comprises the following items 1 to 15:

1. A liquid crystal composition comprising at least one compound selected from the compounds represented by formula (1), at least one compound selected from the compounds represented by formula (2), at least one compound selected from the compounds represented by formula (3), at least one compound selected from the compounds represented by formula (4) and at least one compound selected from the compounds represented by formula (5):

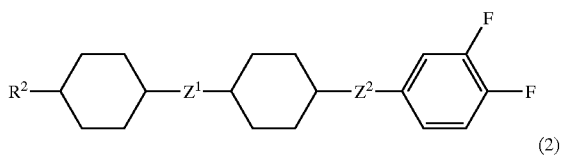
(1)

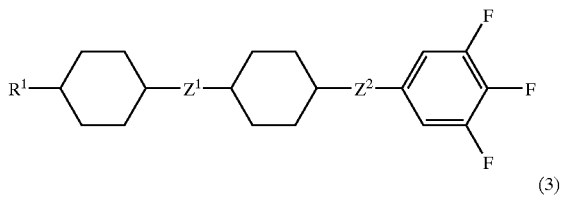
(2)

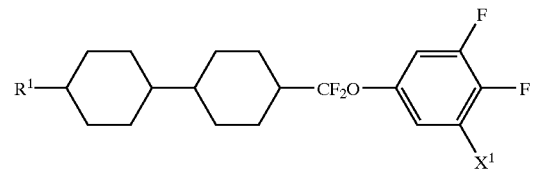
(3)

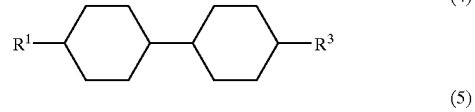
(4)

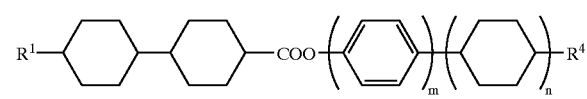
(5)

wherein, R¹ represents alkyl; R² represents alkyl or alkenyl; R³ represents alkyl, alkoxyl, alkenyl or —CF₃, where any hydrogen in alkenyl may be replaced by fluorine; R⁴ represents alkyl or fluorine; X¹ represents hydrogen or fluorine; Z¹ and Z² each independently represent a single bond or —(CH₂)₂—; m and n each independently represents 0 or 1, and the sum of m and n is 1 or 2.

2. The liquid crystal composition described in item 1 which contains from 3 to 40% by weight of at least one compound selected from the compounds represented by formula (1), from 5 to 60% by weight of at least one compound selected from the compounds represented by formula (2), from 5 to 50% by weight of at least one compound selected from the compounds represented by formula (3), from 5 to 40% by weight of at least one compound selected from the compounds represented by formula (4) and from 3 to 30% by weight of at least one compound selected from the compounds represented by formula (5), each based on the total weight of the composition.

3. The liquid crystal composition described in item 1 or 2 which further comprises at least one compound selected from the compounds represented by formula (6):

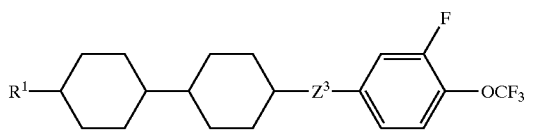

wherein $R^1$ represents alkyl and $Z^3$ represents a single bond or —$CF_2O$—.

4. The liquid crystal composition described in item 3 which contains from 3 to 20% by weight of at least one compound selected from the compounds represented by formula (6), based on the total weight of the composition.

5. A liquid crystal composition which comprises at least one compound selected from the compounds represented by formula (1) as a first component, at least one compound selected from the compounds represented by formula (7) as a second component, and at least one compound selected from the compounds represented by formulas (4) and (5) as a third component:

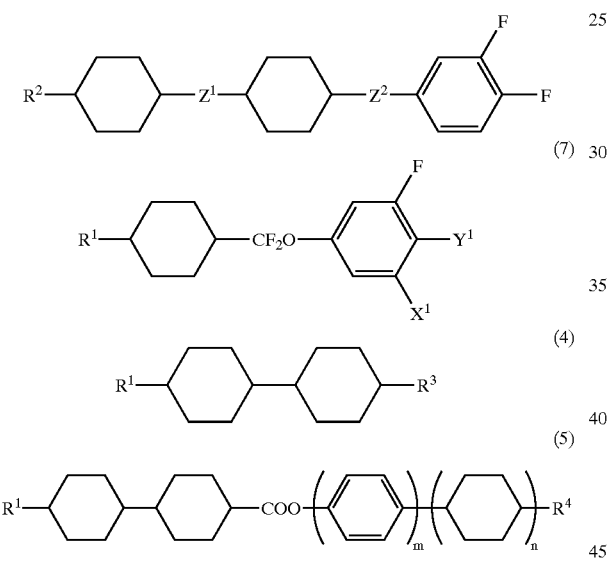

wherein $R^1$ represents alkyl; $R^2$ represents alkyl or alkenyl; $R^3$ represents alkyl, alkoxyl, alkenyl or —$CF_3$, where any hydrogen in alkenyl may be replaced by fluorine; $R^4$ represents alkyl or fluorine; $X^1$ represents hydrogen or fluorine; $Y^1$ represents fluorine or —$OCF_3$; $Z^1$ and $Z^2$ each independently represent a single bond or —$(CH_2)_2$—; m and n each independently represents 0 or 1, and the sum of m and n is 1 or 2.

6. The liquid crystal composition described in item 5 wherein the third component consists of at least one compound selected from the compounds represented by formula (4).

7. The liquid crystal composition described in item 5 wherein the third component consists of at least one compound selected from the compounds represented by formula (5).

8. The liquid crystal composition described in item 5 wherein the third component consists of at least one compound selected from the compounds represented by formula (4) and at least one compound selected from the compounds represented by formula (5).

9. The liquid crystal composition described in any of items 5 to 8 which contains from 5 to 60% by weight of the first component, from 5 to 40% by weight of the second component and from 5 to 60% by weight of the third component, each based on the total weight of the composition.

10. The liquid crystal composition described in any of items 5 to 9 which further comprises at least one compound selected from the compounds represented by formulas (2), (3) and (6) as a fourth component:

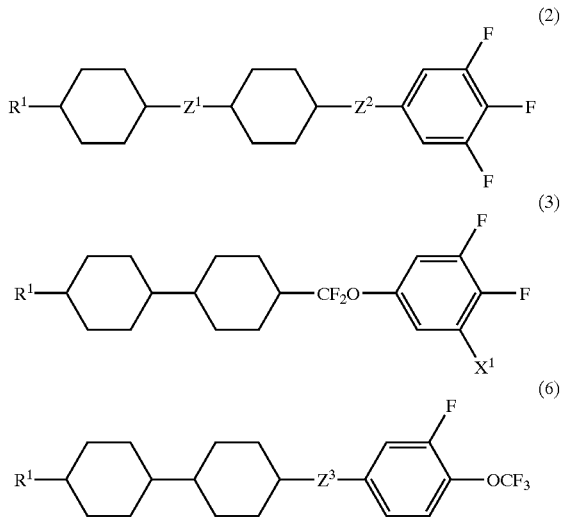

wherein $R^1$ represents alkyl; $X^1$ represents hydrogen or fluorine; $Z^1$ and $Z^2$ each independently represents a single bond or —$(CH_2)_2$—; and $Z^3$ represents a single bond or —$CF_2O$—.

11. The liquid crystal composition described in item 10 which contains from 10 to 50% by weight of the fourth component, based on the total weight of the composition.

12. A liquid crystal display element which comprises a liquid crystal composition described in any of items 1 to 11.

13. The liquid crystal composition described in item 10 wherein the fourth component consists of at least one compound selected from the compounds represented by formula (2).

14. The liquid crystal composition described in item 10 wherein the fourth component consists of at least one compound selected from the compounds represented by formula (3).

15. The liquid crystal composition described in item 10 wherein the fourth component consists of at least one compound selected from the compounds represented by formula (6).

The terms used herein are explained below:

The liquid crystal composition of the present invention or the liquid crystal display element of the present invention may occasionally be abbreviated to "the composition" or "the element", respectively. A liquid crystal display element is a general term for a liquid crystal display panel and a liquid crystal display module. A principal component of a liquid crystal composition is liquid crystalline compounds. The liquid crystalline compound is a general term for a compound having a liquid crystal phase such as a nematic phase, a smectic phase and the like, and a compound having no liquid crystal phase but useful for the composition. At least one compound selected from the compounds represented by formula (1) may be abbreviated to "compound (1)". Compounds represented by formulas (2) to (7) may also be abbreviated in the same manner.

The upper limit of a nematic phase may be abbreviated to "the upper limit". The lower limit of a nematic phase may be abbreviated to "the lower limit". "High in specific resistance" means that the composition has high specific resistance at the initial stage and even after a long-term use. "High in voltage holding ratio" means that the element has high voltage holding ratio at the initial stage and even after a long-term use. The characteristics such as optical anisotropy are explained using the values measured in the same manner as in Examples. The content of a compound in the composition is expressed in terms of weight percent based on the total weight of the composition.

The composition of the present invention satisfies plurality of the characteristics such as wide temperature range of a nematic phase, low viscosity, small optical anisotropy, low threshold voltage and high specific resistance. The composition has plurality of the above characteristics well balanced. The element comprising the composition has an especially high voltage holding ratio.

The composition of the present invention shall be explained in the following order:

First explained is the constitution of components in the composition; second, principal characteristics of the component compound and their main effect on the composition; third, suitable mixing ratios of the compounds with any reasons therefor; fourth, suitable molecular structure of the compounds; fifth, concrete example of the compounds sixth, the method of synthesizing them.

The constitution of the component in the composition shall be first explained. There are 26 types of combination of the component compounds as shown in Table 2, wherein the component compounds in each of types 1 to 26 are indicated by marking a circle. A blank column denotes that no corresponding compound is used as a component. In type 1, for example, compounds (1), (2), (3), (4) and (5) are the components of the composition.

The composition of the present invention is classified into composition A and composition B. Composition A may further contain other compounds. The "other compounds" include a liquid crystalline compound, additives and the like. The "other compounds" are different from compounds (1) to (7). The liquid crystalline compound is mixed with the composition for the purpose of adjusting the characteristics of the composition. The additives include an optically active compound, a coloring matter and the like. An optically active compound is mixed with the compound for the purpose of giving a twist angle by inducing a spiral structure. A coloring matter is mixed with the composition to conform to the element of a guest host (GH) mode.

Composition B consists essentially of the compounds selected from compounds (1) to (7). The term "essentially" here means that composition B contains no liquid crystalline compound other than these compounds. The term "essentially" also means that composition B may further comprise impurities included in these compounds, an optically active compound and a coloring material. Composition B comprises less components than composition A and is preferable to compound A from the viewpoint of the cost. On the other hand, composition A is preferable to composition B in that the physical properties of composition A can be adjusted further by mixing with other liquid crystalline compounds.

Secondly explained are principal characteristics of the component compounds and their effects on the composition. Principal characteristics of the compounds are summarized in Table 3, wherein L means large or high, M means middle degree and S means small or low, and 0 means that the dielectric anisotropy is almost zero or extremely small. Symbols L, M and S are based on the relative evaluation of these compounds.

TABLE 3

TABLE 2

Exemplified combination of compounds

| | Compound (1) | Compound (2) | Compound (3) | Compound (4) | Compound (5) | Compound (6) | Compound (7) |
|---|---|---|---|---|---|---|---|
| Type 1 | ◯ | ◯ | ◯ | ◯ | ◯ | | |
| Type 2 | ◯ | ◯ | ◯ | ◯ | ◯ | ◯ | |
| Type 3 | ◯ | | | ◯ | | | ◯ |
| Type 4 | ◯ | ◯ | | ◯ | | | ◯ |
| Type 5 | ◯ | | ◯ | ◯ | | | ◯ |
| Type 6 | ◯ | | | ◯ | | ◯ | ◯ |
| Type 7 | ◯ | ◯ | ◯ | ◯ | | | ◯ |
| Type 8 | ◯ | ◯ | | ◯ | | ◯ | ◯ |
| Type 9 | ◯ | | ◯ | ◯ | | ◯ | ◯ |
| Type 10 | ◯ | ◯ | ◯ | ◯ | | ◯ | ◯ |
| Type 11 | ◯ | | | | ◯ | | ◯ |
| Type 12 | ◯ | ◯ | | | ◯ | | ◯ |
| Type 13 | ◯ | | ◯ | | ◯ | | ◯ |
| Type 14 | ◯ | | | | ◯ | ◯ | ◯ |
| Type 15 | ◯ | ◯ | ◯ | | ◯ | | ◯ |
| Type 16 | ◯ | ◯ | | | ◯ | ◯ | ◯ |
| Type 17 | ◯ | | ◯ | | ◯ | ◯ | ◯ |
| Type 18 | ◯ | ◯ | ◯ | | ◯ | ◯ | ◯ |
| Type 19 | ◯ | | | ◯ | ◯ | | ◯ |
| Type 20 | ◯ | ◯ | | ◯ | ◯ | | ◯ |
| Type 21 | ◯ | | ◯ | ◯ | ◯ | | ◯ |
| Type 22 | ◯ | | | ◯ | ◯ | ◯ | ◯ |
| Type 23 | ◯ | ◯ | ◯ | ◯ | ◯ | | ◯ |
| Type 24 | ◯ | ◯ | | ◯ | ◯ | ◯ | ◯ |
| Type 25 | ◯ | | ◯ | ◯ | ◯ | ◯ | ◯ |
| Type 26 | ◯ | ◯ | ◯ | ◯ | ◯ | ◯ | ◯ |

| Characteristics of the compounds | | | | | | | |
|---|---|---|---|---|---|---|---|
| | (1) | (2) | (3) | (4) | (5) | (6) | (7) |
| Upper limit temperature | M | M | M | S | L | M | S |
| Viscosity | M | L | M | S | S | M | S |
| Optical anisotropy | M | M | M | S | M | M | M |
| Dielectric anisotropy | S | M | L | 0 | 0 | M | L |
| Specific resistance | L | L | L | L | L | L | L |

The major effects of these compounds when added to the composition are as follows: The compound having a high upper limit temperature elevates the upper limit temperature of the composition. The compound having low viscosity reduces the viscosity of the composition. The compound having a small optical anisotropy reduces the optical anisotropy of the composition. The compound having a large optical anisotropy elevates the optical anisotropy of the composition. The compound having a large dielectric anisotropy elevates the dielectric anisotropy of the composition and reduces the threshold voltage of the composition. The compound having high specific resistance elevates the voltage holding ratio of the element.

Third explained are suitable mixing ratios of the component compounds of the composition and the reasons therefor.

The compositions in the aforementioned item 1 and the items dependent thereon correspond to types 1 and 2 in Table 2. In these compositions, the content of compound (1) is preferably 3% or more for elevating the upper limit temperature and 40% or less for reducing the lower limit temperature, more preferably 3 to 25%. The content of compound (2) is preferably 5% or more for reducing the threshold voltage and 60% or less for reducing the lower limit temperature, more preferably 3 to 10%.

The content of compound (3) is preferably 5% or more for reducing the threshold voltage and 50% or less for reducing the lower limit temperature, more preferably 10 to 40%. The content of compound (4) is preferably 5% or more for reducing the optical anisotropy and 40% or less for reducing the lower limit temperature, more preferably 10 to 35%. The content of compound (5) is preferably 3% or more for reducing the optical anisotropy or for elevating the upper limit temperature and 30% or less for reducing the lower limit temperature, more preferably 5 to 15%. The content of compound (6), if added, is preferably 3% or more for reducing the threshold voltage and 20% or less for reducing the lower limit temperature, more preferably 3 to 10%.

Next, the compositions in the aforementioned item 5 and the items dependent thereon correspond to types 3 to 26 in Table 2. In these compositions, the content of the first component is preferably 5% or more for elevating the upper limit temperature and 60% or less for reducing the lower limit temperature, more preferably 20 to 50%. The content of the second component is preferably 5% or more for reducing the threshold voltage and 40% or less for reducing the lower limit temperature, more preferably 10 to 30%. The content of the third component is preferably 5% or more for reducing the optical anisotropy and 60% or less for reducing the lower limit temperature, more preferably from 10 to 50%. The content of the fourth component, if added, is preferably 10% or more for further reducing the threshold voltage and 50% or less for further reducing the lower limit temperature, more preferably 20 to 40%.

Fourth, desirable molecular structures of the compounds as a component are explained below:

The symbol $R^1$ was used in several formulas of the compounds. $R^1$ may be identical or different in these compounds. For example, in one case, $R^1$ is ethyl in both compounds (1) and (2). In another case, $R^1$ of compound (1) is ethyl and $R^1$ of compound (2) is propyl. This rule is also applicable to the symbols $R^2$, $R^3$, $R^4$, $Z^1$, $Z^2$, $Z^3$, $X^1$, $Y^1$, m and n.

$R^1$ is preferably alkyl of 1 to 10 carbons. $R^2$ is preferably alkyl of 1–10 carbons or alkenyl of 2 to 10 carbons. $R^3$ is preferably alkyl of 1 to 10 carbons or alkoxyl of 1 to 10 carbons, alkenyl of 2 to 10 carbons in which any hydrogen may be replaced by fluorine, or $—CF_3$. $R^4$ is preferably fluorine or alkyl of 1 to 10 carbons.

Preferred alkyl is methyl, ethyl, propyl, butyl, pentyl, hexyl, heptyl and octyl. More preferred are ethyl, propyl, butyl, pentyl and heptyl.

Preferred alkenyl is vinyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl and 5-hexenyl. More preferred are vinyl, 1-propenyl, 3-butenyl and 3-pentenyl. A preferable steric configuration of —CH═CH— in these alkenyls depends on the position of the double bond. Alkenyls such as 1-propenyl, 1-butenyl, 1-pentenyl, 1-hexenyl, 3-pentenyl and 3-hexenyl are preferably in trans configuration, while alkenyls such as 2-butenyl, 2-pentenyl and 2-hexenyl are preferably in cis configuration.

Preferred alkoxyl is methoxy, ethoxy, propoxy, butoxy, pentyloxy, hexyloxy and heptyloxy. More preferred are methoxy and ethoxy.

Preferred examples of alkenyl in which any hydrogen may be replaced by fluorine are 2,2-difluoro-vinyl, 3,3-difluoro-2-propenyl, 4,4-difluoro-3-butenyl and 5,5-difluoro-4-pentenyl. More preferred are 2,2-difluoro-vinyl and 4,4-difluoro-3-butenyl.

1,4-Cyclohexylene of the component compound is preferably in trans configuration rather than cis configuration.

Fifth, concrete examples of the compounds as a component are given. The preferable compounds are compounds (1-1) to (7-3). The symbols $R^1$, $R^2$ and $R^5$ are used in several of these compounds. In any two compounds, a group represented by $R^1$, for example, may be identical or different as already stated.

$R^1$ and $R^5$ each independently represent alkyl and $R^2$ represents alkyl or alkenyl. $R^1$ and $R^5$ are preferably alkyl of 1 to 10 carbons. $R^2$ is preferably alkyl of 1 to 10 carbons or alkenyl of 2 to 10 carbons. Preferred or more preferred alkyl and alkenyl are as shown above. In these alkenyl, preferable steric configuration of —CH═CH— is as described above. In the preferable compounds, cis is more preferable than trans in the steric configuration of 1,4-cyclohexylene, where applicable.

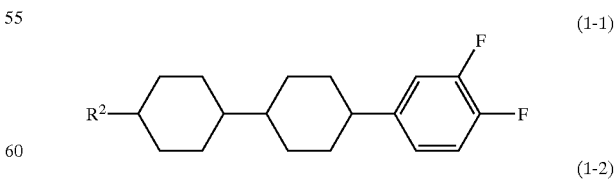
(1-1)

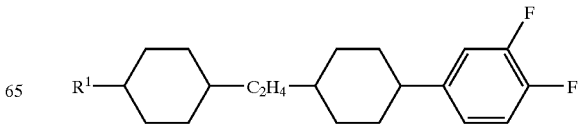
(1-2)

(1-3)
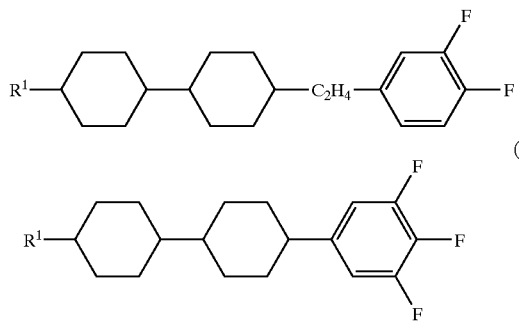
(2-1)

(2-2)
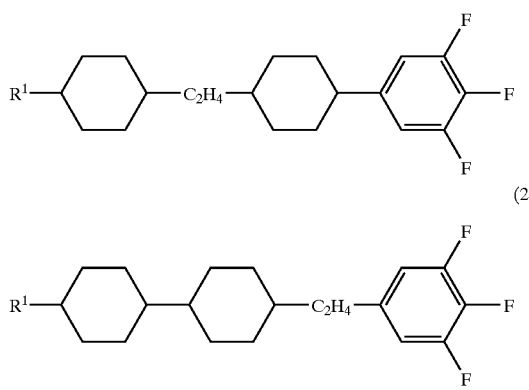
(2-3)

(3-1)
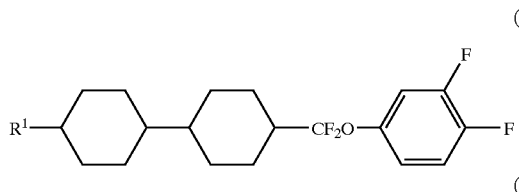
(3-2)

(4-1)
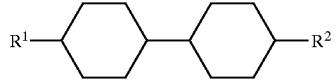
(4-2)
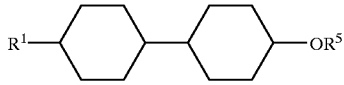
(4-3)
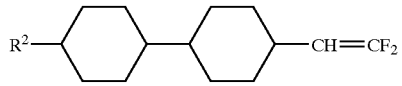
(4-4)
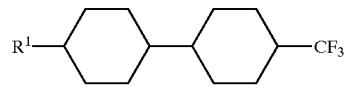
(5-1)
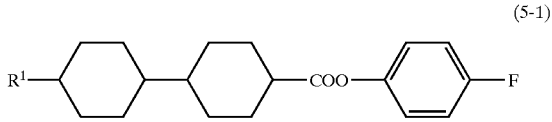

(5-2)
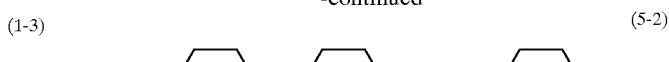
(5-3)
(6-1)
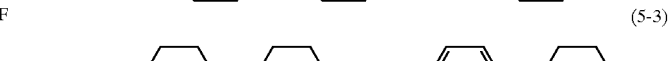
(6-2)
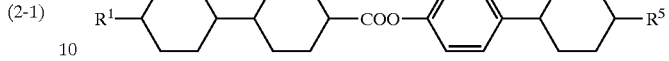
(7-1)
(7-2)
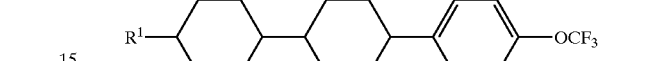
(7-3)
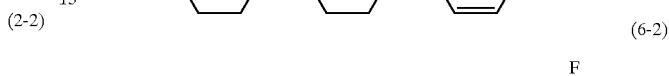

Sixth, the method for the preparation of the compounds as a component is explained. These compounds can be prepared by known methods as specified below. Compound (1-1) is prepared according to the method described in JP-A-154135/1982. Compound (2-1) is prepared according to the method described in JP-A-233626/1990. Compounds (3-1), (6-2) and (7-1) are prepared by modifying the method described in JP-A-233626/1990. Compound (4-1) is prepared according to the method described in JP-A-70624/1984. Compound (5-1) is prepared according to the method described in JP-A-135445/1981.

The compounds for which preparation methods are not specified above can be prepared according to the methods described in Organic Syntheses (John Wiley & Sons, Inc.), Organic Reactions (John Wiley & Sons, Inc.), Comprehensive Organic Synthesis (Pergamon Press), New Experimental Chemistry Course (Shin Jikken Kagaku Kouza) (Maruzen, Inc.) and the like. The composition is prepared according to known methods from the compounds thus obtained. For example, the compounds are mixed and heated to dissolve each other to prepare a composition.

The optical anisotropy of the present composition mainly ranges from 0.06 to 0.075. An element comprising the composition has high voltage holding ratio. Accordingly, the composition is suitable for an AM element, especially for a reflection type or semi-transmission type AM element.

The composition can be used not only for an AM element but also for a PM element. It can be used for the elements having modes such as PC, TN, STN, ECB, OCB, IPS and VA. These elements may be a reflection type, a transmission type or a semi-transmission type. These composition can be used for such elements as nematic curvilinear aligned phase (NCAP) made by microcapsulating the composition and polymer dispersed (PD), e.g., polymer network (PN) element.

EXAMPLES

The present invention shall be explained in detail by way of Examples, which does not limited the present invention. Compounds described in Comparative Examples and Examples are expressed by the symbols according to the definition set forth in Table 4. In Table 4, the steric configuration of 1,4-cyclohexylene and 1,3-dioxane-2,5-diyl is a trans-form. The bonding group of —CH=CH— is a trans-form. The parenthesized number next to the symbolized compounds in the Examples corresponds to the number of the desirable compound. The symbol (–) denotes the other compound than the numbered compounds. The ratio of compounds (percentage) is expressed in terms of weight percentage (% by weight) based on the total weight of the composition. The characteristics of the composition are given last.

TABLE 4

| Notation of compound using symbols $R—(A_1)—Z_1—\ldots—Z_n—(A_n)—X$ | |
|---|---|
| 1) Left terminal group R— | Symbol |
| $C_nH_{2n+1}—$ | n— |
| $C_nH_{2n+1}OC_mH_{2m}—$ | nOm— |
| $CH_2=CH—$ | V— |
| $CH_2=CHC_nH_{2n}—$ | Vn— |
| $C_nH_{2n+1}CH=CHC_mH_{2m}—$ | nVm— |
| 2) Ring structure —(A_n)— | Symbol |
| 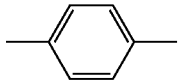 | B |
| 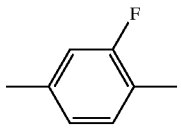 | B(F) |
| 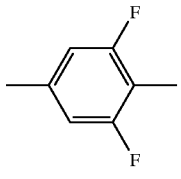 | B(F,F) |
|  | H |
| 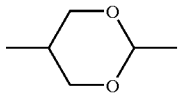 | G |
| 3) Bonding group —$Z_n$— | Symbol |
| —$C_2H_4$— | 2 |
| —COO— | E |

TABLE 4-continued

| Notation of compound using symbols $R—(A_1)—Z_1—\ldots—Z_n—(A_n)—X$ | |
|---|---|
| —$CF_2O$— | X |
| 4) Right terminal group —X | Symbol |
| —F | —F |
| —Cl | —CL |
| —$CF_3$ | —CF3 |
| —$OCF_3$ | —OCF3 |
| —$OCF_2H$ | —OCF2H |
| —$C_nH_{2n+1}$ | —n |
| —$OC_nH_{2n+1}$ | —On |
| —CH=$CH_2$ | —V |
| —CH=$CF_2$ | —VFF |
| —$COOCH_3$ | —EMe |
| 5) Examples of Description | |

Example 1 5-HXB(F,F)—F

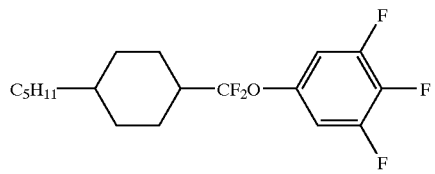

Example 2 3-HHEBH-3

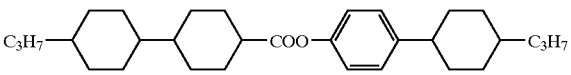

Example 3 3-H2HB(F)—F

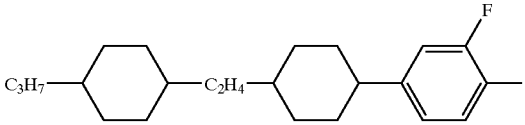

The characteristic values were measured according to the following methods:

Upper limit temperature of a nematic phase (NI; ° C.): A sample was put on a hot plate of a melting point measuring apparatus equipped with a polarizing microscope and heated at a rate of 1° C./min. The temperature at which a part of the sample began to change from a nematic phase into an isotropic liquid was measured. The upper limit temperature of a nematic phase may occasionally be abbreviated to "upper limit temperature".

Lower limit temperature (Tc; ° C.) of a nematic phase: A sample having a nematic phase was kept in a freezer at a temperatures of 0° C., –10° C., –20° C., –30° C. or –40° C. for ten days, respectively, to observe liquid crystal phase. For example, when the sample remains in a nematic phase at –20° C. and changes to a crystal or smectic phase at –30° C., Tc is expressed as <–20° C. The lower limit temperature of a nematic phase may occasionally be abbreviated to "lower limit temperature".

Optical anisotropy (Δn; measured at 25° C.): Optical anisotropy was measured by means of an Abbe refractometer with a light having a wavelength of 589 nm.

Viscosity (η; mPa·s, measured at 25° C.): Viscosity was measured by means of an E-type viscometer.

Dielectric anisotropy (Δ∈; measured at 25° C.): A sample was put into a TN element having a cell gap between two sheets of glass substrates of 9 μm and a twist angle of 80 degrees. A dielectric constant of a liquid crystal molecule in the parallel direction (∈∥) was measured by applying an electric pressure of 10 volts to the cell. A dielectric constant of a liquid crystal molecule in the perpendicular direction (∈⊥) was measured by applying an electric pressure of 0.5 volt to the cell. The dielectric anisotropy was calculated by an equation of Δ∈=∈∥−∈⊥. A dielectric anisotropy of a composition having a positive dielectric constant was measured by the method. When a compound is used as a sample, it was mixed with a suitable liquid crystal composition to measure the dielectric constant of composition.

Threshold voltage (Vth; measured at 25° C.; V): A sample was put into a TN element driven with a normally white mode and having two sheets of glass substrates whose interval (cell gap) was (0.5/Δn) μm and whose twist angle was 80 degree. Δn is a value of the optical anisotropy measured by the above method. A rectangular wave having a frequency of 32 Hz was applied to this TN element. The applied voltage was increased to measure a value of the voltage when a transmittance of the light passing through the element reached 90%.

Voltage holding ratio (VHR; %): Voltage holding ratio was measured according to the method described in EIAJ·ED-2521A of Standard of Electric Industries Association of Japan for measuring a voltage holding ratio of an element having a liquid crystal composition and an aligning film. A TN element used for measurement has a polyimide aligning film and has a cell gap of 6 μm. A wave form of the voltage applied to a TN element at 25° C. was observed by means of a cathode ray oscilloscope to measure an area between a voltage curve and the horizontal line in a unit frequency. After removing the TN element, a wave form of the voltage was observed in the same manner to measure an area. Voltage holding ratio was calculated by comparison of the two areas. The value obtained was expressed as VHR-1. Then, this TN element was heated at 100° C. for 250 hours. After cooling to 25° C., the TN element was measured for the voltage holding ratio in a similar manner. The value obtained after heating was expressed as VHR-2. This heating test was carried out as a substitution of a test for a long-term use.

Comparative Example 1

| | |
|---|---|
| 3-HEH-3 | 8% |
| 4-HEH-3 | 8% |
| 3-HHEH-3 | 4% |
| 4-HHEH-3 | 4% |
| 5-HHEH-3 | 4% |
| 3-GHB (F, F)-F | 5% |
| 4-HHEB (F, F)-F | 4% |
| 3-HHXB (F, F)-F | 3% |
| 3-HH-4 | 5% |
| 3-HH-O1 | 7% |
| 5-HH-O1 | 10% |
| 1V2-HH-3 | 10% |
| 2-HH-EMe | 8% |
| 3-HH-EMe | 5% |
| 3-HB-O2 | 5% |
| 3-HHB-1 | 4% |
| 3-HHB-O1 | 3% |
| 4-HBBH-4 | 3% |

NI = 82.4° C.; T$_c$ < −20° C.; Δn = 0.053; η = 14.6 mPa · s; Vth = 2.47 V; VHR-1 = 99.0%; VHR-2 = 83.2%.

The composition of Example 8 disclosed in JP-A 288470/2001 is selected here, because it contains compound (3) of the present invention and has the smallest optical anisotropy. The components and the characteristics of the composition are shown below.

The composition has high lower limit temperature, high threshold voltage and a small VHR-2.

Comparative Example 2

| | |
|---|---|
| 3-HHEH-3 | 4% |
| 4-HHEH-3 | 4% |
| 5-H2B (F)-F | 4% |
| 7-HB (F, F)-F | 6% |
| 5-HB-CL | 4% |
| 3-HHB (F, F)-F | 10% |
| 5-HHB (F, F)-F | 5% |
| 3-HHB (F)-OCF2H | 5% |
| 3-HHB (F)-OCF3 | 10% |
| 3-HHB (F, F)-OCF3 | 6% |
| 3-GHB (F, F)-F | 8% |
| 3-HGB-F | 5% |
| 3-HHXB (F, F)-F | 6% |
| 5-HHXB (F, F)-F | 5% |
| 3-H2HXB (F, F)-F | 5% |
| 3-HH-4 | 5% |
| 3-HB-O2 | 5% |
| 3-HHEBH-3 | 3% |

NI = 79.8° C.; T$_c$ < −20° C.; Δn = 0.069; η = 24.0 mPa · s; Vth = 1.28 V; VHR-1 = 98.5%; VHR-2 = 84.9%.

The compositions of Example 18 disclosed in JP-A-288470/2001 is selected, because it contains compound (3) of the present invention and has the lowest threshold voltage. The components and the characteristics of the composition are shown below.

The composition has a low upper limit temperature, a high lower limit temperature and a small VHR-2.

Comparative Example 3

| | |
|---|---|
| 3-HHXB (F)-F | 2% |
| 3-H2HXB (F)-F | 2% |
| 3-H2HXB (F)-OCF3 | 2% |
| 2-HHXB (F, F)-F | 5% |
| 3-HHXB (F, F)-F | 5% |
| 4-HHXB (F, F)-F | 5% |
| 5-HHXB (F, F)-F | 5% |
| 7-HB (F, F)-F | 9% |
| 3-H2HB (F, F)-F | 6% |
| 3-HHB (F, F)-F | 10% |
| 4-HHB (F, F)-F | 5% |
| 3-HH2B (F, F)-F | 7% |
| 3-HBB (F, F)-F | 15% |
| 5-HEB (F, F)-F | 6% |
| 2-HHB (F, F) XB (F, F)-F | 4% |
| 3-HHB (F, F) XB (F, F)-F | 4% |
| 4-HHB (F, F) XB (F, F)-F | 4% |
| 5-HHB (F, F) XB (F, F)-F | 4% |

NI = 71.2° C.; T$_c$ < −10° C.; Δn = 0.080; η = 26.2 mPa · s; Vth = 1.45 V; VHR-1 = 98.6%; VHR-2 = 86.2%.

The compositions of Example 4 disclosed in JP-A 10-204436/1998 is selected, because it contains compound (3) of the present invention and has the smallest optical anisotropy. The components and the characteristics of the composition are shown below.

The composition has a low upper limit temperature, a high lower limit temperature, a large optical anisotropy and a small VHR-2.

Comparative Example 4

The composition of Use Example 19 disclosed in JP-A 10-204016/1998 is selected, because it contains compound (7) of the present invention and has the smallest optical anisotropy. The components and the characteristics of the composition are shown below.

The composition has a high lower limit temperature, a large optical anisotropy and high threshold voltage.

| 5-HXB (F, F)-F | | 2% |
|---|---|---|
| 5-HXB (F, F)-OCF3 | | 2% |
| 5-HXB (F, F)-CF3 | | 2% |
| 5-HXB (F, F)-OCF2H | | 2% |
| 5-HB-F | | 12% |
| 6-HB-F | | 8% |
| 2-HHB-OCF3 | | 7% |
| 3-HHB-OCF3 | | 7% |
| 4-HHB-OCF3 | | 7% |
| 5-HHB-OCF3 | | 5% |
| 3-HH2B-OCF3 | | 4% |
| 5-HH2B-OCF3 | | 4% |
| 3-HHB (F, F)-OCF3 | | 5% |
| 3-HBB (F)-F | | 10% |
| 5-HBB (F)-F | | 10% |
| 3-HH2B (F)-F | | 3% |
| 3-HB (F) BH-3 | | 3% |
| 5-HBBH-3 | | 3% |
| 3-HHB (F, F)-OCF2H | | 4% |

NI = 82.6° C.; $T_c$ < −10° C.; Δn = 0.090; η = 18.1 mPa · s; Vth = 2.12; VHR-1 = 98.1%; VHR-2 = 93.2%.

Example 1

| 2-HHB (F)-F | (1-1) | 6% |
|---|---|---|
| 3-HHB (F)-F | (1-1) | 10% |
| 5-HHB (F)-F | (1-1) | 6% |
| 2-H2HB (F)-F | (1-2) | 5% |
| 3-H2HB (F)-F | (1-2) | 7% |
| 3-HH-4 | (4-1) | 5% |
| 5-HH-V | (4-1) | 20% |
| 3-HHEB-F | (5-1) | 7% |
| 5-HHEB-F | (5-1) | 7% |
| 3-HHEBH-3 | (5-3) | 5% |
| 3-HHEBH-4 | (5-3) | 5% |
| 5-HXB (F, F)-F | (7-1) | 12% |
| 7-HXB (F, F)-F | (7-1) | 5% |

NI = 90.5° C.; $T_c$ < −30° C.; Δn = 0.067; η = 18.0 mPa · s; Vth = 1.73 V; VHR-1 = 98.9%; VHR-2 = 93.8%.

Example 2

| 2-HHB (F)-F | (1-1) | 7% |
|---|---|---|
| 3-HHB (F)-F | (1-1) | 15% |
| 5-HHB (F)-F | (1-1) | 7% |
| 2-HH2B (F)-F | (1-3) | 2% |
| 5-HH-V | (4-1) | 20% |
| 3-HHEB-F | (5-1) | 5% |
| 5-HHEB-F | (5-1) | 5% |
| 3-HHEBH-3 | (5-3) | 5% |
| 3-HHEBH-4 | (5-3) | 5% |
| 3-HHEBH-5 | (5-3) | 4% |
| 5-HXB (F, F)-F | (7-1) | 12% |
| 7-HXB (F, F)-F | (7-1) | 5% |
| 5-HXB (F)-F | (7-2) | 4% |
| 5-HXB (F)-OCF3 | (7-3) | 4% |

NI = 86.8° C.; $T_c$ < −30° C.; Δn = 0.069; η = 17.7 mPa · s; Vth = 1.83 V; VHR-1 = 98.3%; VHR-2 = 93.1%.

Example 3

| V-HHB (F)-F | (1-1) | 7% |
|---|---|---|
| 3-HHB (F)-F | (1-1) | 14% |
| 5-HHB (F)-F | (1-1) | 7% |
| 2-H2HB (F)-F | (1-2) | 5% |
| 3-H2HB (F)-F | (1-2) | 5% |
| 5-HH-V | (4-1) | 20% |
| 5-HH-O1 | (4-2) | 4% |
| 5-HH-CF3 | (4-4) | 2% |
| 3-HHEH-3 | (5-2) | 5% |
| 3-HHEH-4 | (5-2) | 5% |
| 3-HHEBH-3 | (5-3) | 5% |
| 3-HHEBH-4 | (5-3) | 5% |
| 5-HXB (F, F)-F | (7-1) | 8% |
| 5-HXB (F)-OCF 3 | (7-3) | 8% |

NI = 90.7° C.; $T_c$ < −30° C.; Δn = 0.068; η = 18.8 mPa · s; Vth = 1.74 V; VHR-1 = 98.8%; VHR-2 = 93.5%.

Example 4

| 2-HHB (F)-F | (1-1) | 5% |
|---|---|---|
| 3-HHB (F)-F | (1-1) | 10% |
| 5-HHB (F)-F | (1-1) | 5% |
| 2-H2HB (F)-F | (1-2) | 6% |
| 3-H2HB (F)-F | (1-2) | 6% |
| 2-HHB (F, F)-F | (2-1) | 5% |
| 3-HHB (F, F)-F | (2-1) | 10% |
| 3-H2HB (F, F)-F | (2-2) | 3% |
| 3-HH2B (F, F)-F | (2-3) | 2% |
| 3-HH-4 | (4-1) | 3% |
| 5-HH-V | (4-1) | 8% |
| 5-HH-VFF | (4-3) | 3% |
| 3-HHEBH-3 | (5-3) | 5% |
| 3-HHEBH-4 | (5-3) | 5% |
| 3-HHB (F)-OCF3 | (6-1) | 2% |
| 2-HHXB (F)-OCF3 | (6-2) | 3% |
| 3-HHXB (F)-OCF3 | (6-2) | 4% |
| 5-HHXB (F)-OCF3 | (6-2) | 4% |
| 5-HXB (F, F)-F | (7-1) | 7% |
| 5-HXB (F)-OCF3 | (7-3) | 4% |

NI = 90.3° C.; $T_c$ < −30° C.; Δn = 0.074; η = 23.8 mPa · s; Vth = 1.47 V; VHR-1 = 98.6%; VHR-2 = 93.3%.

Example 5

| 3-HHB (F)-F | (1-1) | 10% |
|---|---|---|
| V-HHB (F)-F | (1-1) | 11% |
| 2-H2HB (F)-F | (1-2) | 10% |
| 3-H2HB (F)-F | (1-2) | 8% |
| 5-H2HB (F)-F | (1-2) | 5% |
| 2-HHB (F, F)-F | (2-1) | 5% |
| 3-HHB (F, F)-F | (2-1) | 5% |
| 2-HHXB (F, F)-F | (3-1) | 5% |
| 3-HHXB (F, F)-F | (3-1) | 8% |
| 4-HHXB (F, F)-F | (3-1) | 2% |
| 3-HHXB (F)-F | (3-2) | 2% |
| 3-HH-4 | (4-1) | 5% |
| 3-HHEBH-3 | (5-3) | 4% |
| 3-HHEBH-4 | (5-3) | 4% |
| 5-HXB (F, F)-F | (7-1) | 9% |
| 7-HXB (F, F)-F | (7-1) | 5% |
| 101-HH-3 | (-) | 2% |

NI = 86.7° C.; $T_c$ < −30° C.; Δn = 0.074; η = 22.5 mPa · s; Vth = 1.36 V; VHR-1 = 98.3%; VHR-2 = 93.2%.

Example 6

| V-HHB (F)-F | (1-1) | 3% |
|---|---|---|
| 2-HHB (F)-F | (1-1) | 5% |
| 2-HHB (F, F)-F | (2-1) | 10% |
| 3-HHB (F, F)-F | (2-1) | 10% |
| 2-HHXB (F, F)-F | (3-1) | 4% |
| 3-HHXB (F, F)-F | (3-1) | 10% |
| 4-HHXB (F, F)-F | (3-1) | 5% |
| 5-HHXB (F, F)-F | (3-1) | 7% |
| 2-HHXB (F)-F | (3-2) | 5% |
| 3-HHXB (F)-F | (3-2) | 5% |
| 3-HH-4 | (4-1) | 5% |
| 5-HH-V | (4-1) | 25% |
| 3-HHEH-3 | (5-2) | 3% |
| 3-HHEH-4 | (5-2) | 3% |

NI = 85.2° C.; $T_c$ < −30° C.; Δn = 0.070; η = 19.4 mPa · s; Vth = 1.49 V; VHR-1 = 98.5%; VHR-2 = 93.1%.

Example 7

| 3-HHB (F)-F | (1-1) | 10% |
|---|---|---|
| 2-HHB (F)-F | (1-2) | 8% |
| 2-HH2B (F)-F | (1-3) | 3% |
| 2-HHB (F, F)-F | (2-1) | 9% |
| 3-HHB (F, F)-F | (2-1) | 9% |
| 3-H2HB (F, F)-F | (2-2) | 12% |
| 5-H2HB (F, F)-F | (2-2) | 12% |

-continued

| | | |
|---|---|---|
| 3-HH2B (F, F)-F | (2-3) | 3% |
| 2-HHXB (F, F)-F | (3-1) | 5% |
| 3-HHXB (F, F)-F | (3-1) | 8% |
| 3-HH-4 | (4-1) | 5% |
| 5-HH-V | (4-1) | 10% |
| 3-HHEBH-3 | (5-3) | 3% |
| 3-HHEBH-4 | (5-3) | 3% |

NI = 86.1° C.; T$_c$ < −30° C.; Δn = 0.072; η = 22.1 mPa · s; Vth = 1.29 V; VHR-1 = 98.9%; VHR-2 = 93.4%.

Example 8

| | | |
|---|---|---|
| 2-HHB (F)-F | (1-1) | 4% |
| 2-H2HB (F)-F | (1-2) | 3% |
| 2-HHB (F, F)-F | (2-1) | 6% |
| 3-HHB (F, F)-F | (2-1) | 10% |
| 4-HHB (F, F)-F | (2-1) | 3% |
| 3-H2HB (F, F)-F | (2-2) | 12% |
| 4-H2HB (F, F)-F | (2-2) | 8% |
| 5-H2HB (F, F)-F | (2-2) | 12% |
| 2-HHXB (F, F)-F | (3-1) | 5% |
| 3-HHXB (F, F)-F | (3-1) | 8% |
| 3-HH-4 | (4-1) | 3% |
| 5-HH-V | (4-1) | 6% |
| 5-HH-O1 | (4-2) | 3% |
| 5-HH-VFF | (4-3) | 3% |
| 5-HH-CF3 | (4-4) | 2% |
| 3-HHEB-F | (5-1) | 4% |
| 5-HHEB-F | (5-1) | 3% |
| 3-HHEBH-3 | (5-3) | 5% |

NI = 85.3° C.; T$_c$ < −30° C.; Δn = 0.070; η = 22.3 mPa · s; Vth = 1.32 V; VHR-1 = 98.7%; VHR-2 = 93.1%.

Example 9

| | | |
|---|---|---|
| 3-HHB (F)-F | (1-1) | 4% |
| 2-HHB (F, F)-F | (2-1) | 5% |
| 3-HHB (F, F)-F | (2-1) | 10% |
| 2-H2HB (F, F)-F | (2-2) | 5% |
| 3-H2HB (F, F)-F | (2-2) | 12% |
| 2-HHXB (F, F)-F | (3-1) | 5% |
| 3-HHXB (F, F)-F | (3-1) | 11% |
| 5-HHXB (F, F)-F | (3-1) | 5% |
| 3-HHXB (F)-F | (3-2) | 7% |
| 3-HH-4 | (4-1) | 6% |
| 5-HH-V | (4-1) | 10% |
| 3-HHEB-F | (5-1) | 6% |
| 3-HHEBH-3 | (5-3) | 4% |
| 3-HHB (F)-OCF3 | (6-1) | 3% |
| 2-HHXB (F)-OCF3 | (6-2) | 3% |
| 3-HHXB (F)-OCF3 | (6-2) | 4% |

NI = 90.6° C.; T$_c$ < −30° C.; Δn = 0.074; η = 23.1 mPa · s; Vth = 1.33 V; VHR-1 = 98.9%; VHR-2 = 93.3%.

Example 10

| | | |
|---|---|---|
| 2-HHB (F)-F | (1-1) | 4% |
| 3-HHB (F)-F | (1-1) | 8% |
| 2-HHB (F, F)-F | (2-1) | 8% |
| 3-HHB (F, F)-F | (2-1) | 8% |
| 3-H2HB (F, F)-F | (2-2) | 12% |
| 2-HHXB (F, F)-F | (3-1) | 5% |
| 3-HHXB (F, F)-F | (3-1) | 5% |
| 5-HHXB (F, F)-F | (3-1) | 5% |
| 3-HHXB (F)-F | (3-2) | 3% |
| 3-HH-4 | (4-1) | 5% |
| 5-HH-V | (4-1) | 18% |
| 3-HHEBH-3 | (5-3) | 3% |
| 3-HHEBH-4 | (5-3) | 2% |
| 3-HHEBH-5 | (5-3) | 2% |
| 3-HHB (F)-OCF3 | (6-1) | 3% |
| 3-HHXB (F)-OCF3 | (6-2) | 7% |
| 101-HH-3 | (-) | 2% |

NI = 91.9° C.; T$_c$ < −30° C.; Δn = 0.071; η = 20.3 mPa · s; Vth = 1.48 V; VHR-1 = 98.6%; VHR-2 = 93.9%.

The composition of the present invention satisfies plurality of the characteristics such as a wide temperature range of a nematic phase, low viscosity. small optical anisotropy, low threshold voltage and high specific resistance. The composition has plurality of these characteristics well balanced. The element comprising the composition has a specifically high voltage holding ratio. The composition is suitable for a reflection type and a semi-transmission type AM element because it typically has the optical anisotropy of 0.06 to 0.075.

What is claimed is:

1. A liquid crystal composition comprising at least one compound selected from the compounds represented by formula (1), at least one compound selected from the compounds represented by formula (2), at least one compound selected from the compounds represented by formula (3), at least one compound selected from the compounds represented by formula (4) and at least one compound selected from the compounds represented by formula (5):

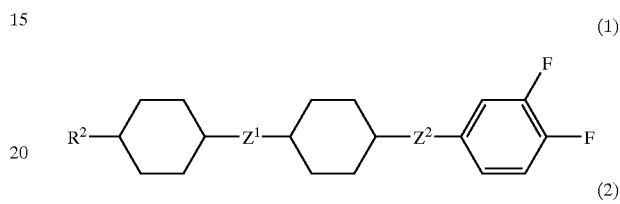

(1)

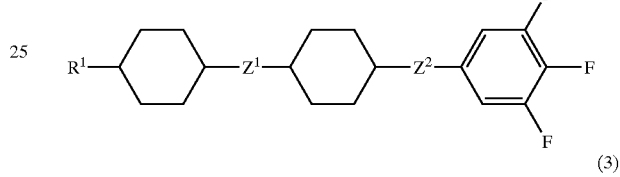

(2)

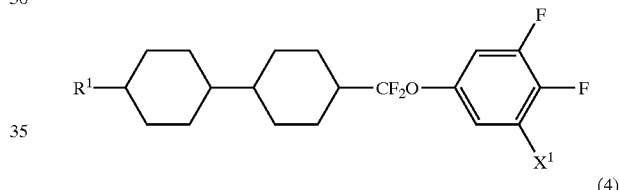

(3)

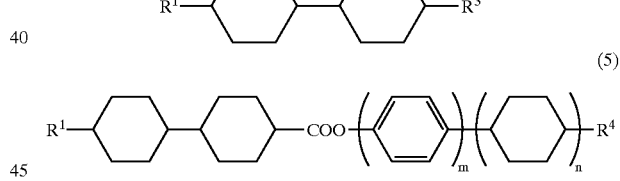

(4)

(5)

wherein $R^1$ represents alkyl; $R^2$ represents alkyl or alkenyl; $R^3$ represents alkyl, alkoxyl, alkenyl or —CF$_3$, where any hydrogen in alkenyl may be replaced by fluorine; $R^4$ represents alkyl or fluorine; $X^1$ represents hydrogen or fluorine; $Z^1$ and $Z^2$ each independently represent a single bond or —(C$_2$)$_2$—; m and n each independently represents 0 or 1, and the sum of m and n is 1 or 2.

2. The liquid crystal composition according to claim 1 which contains from 3 to 40% by weight of at least one compound selected from the compounds represented by formula (1), from 5 to 60% by weight of at least one compound selected from the compounds represented by formula (2), from 5 to 50% by weight of at least one compound selected from the compounds represented by formula (3), from 5 to 40% by weight of at least one compound selected from the compounds represented by formula (4) and from 3 to 30% by weight of at least one compound selected from the compounds represented by formula (5), each based on the total weight of the composition.

3. The liquid crystal composition according to claim 1 which further comprises at least one compound selected from the compounds represented by formula (6):

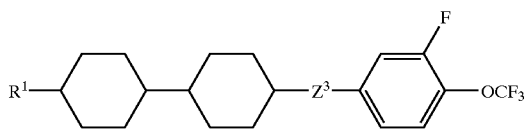
(6)

wherein R¹ represents alkyl and Z³ represents a single bond or —CF₂O—.

4. The liquid crystal composition according to claim 2 which further comprises at least one compound selected from the compounds represented by formula (6):

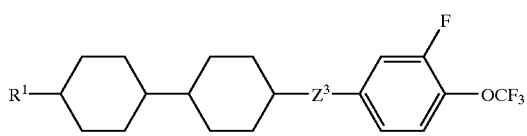
(6)

wherein R¹ represents alkyl and Z³ represents a single bond or —CF₂O—.

5. The liquid crystal composition according to claim 3 which contains from 3 to 20% by weight of at least one compound selected from the compounds represented by formula (6), based on the total weight of the composition.

6. The liquid crystal composition according to claim 4 which contains from 3 to 20% by weight of at least one compound selected from the compounds represented by formula (6), based on the total weight of the composition.

7. A liquid crystal composition which comprises at least one compound selected from the compounds represented by formula (1) as a first component, at least one compound selected from the compounds represented by formula (7) as a second component, and at least one compound selected from the compounds represented by formulas (4) and (5) as a third component:

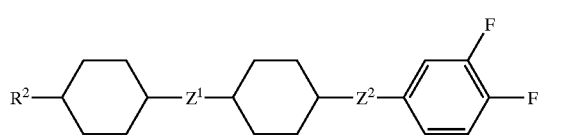
(1)

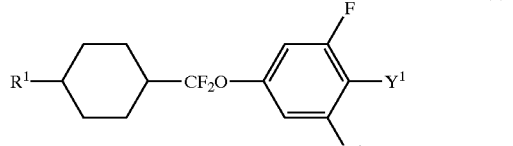
(7)

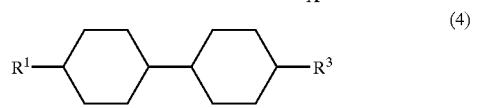
(4)

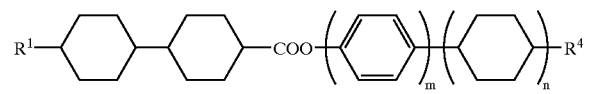
(5)

wherein R¹ represents alkyl; R² represents alkyl or alkenyl; R³ represents alkyl, alkoxyl, alkenyl or —CF₃, where any hydrogen in alkenyl may be replaced by fluorine; R⁴ represents alkyl or fluorine; X¹ represents hydrogen or fluorine; Y¹ represents fluorine or —OCF₃; Z¹ and Z² each independently represent a single bond or —(CH₂)₂—; m and n each independently represents 0 or 1, and the sum of m and n is 1 or 2.

8. The liquid crystal composition according to claim 7 which contains from 5 to 60% by weight of the first component, from 5 to 40% by weight of the second component and from 5 to 60% by weight of the third component, each based on the total weight of the composition.

9. The liquid crystal composition according to claim 7 which further comprises at least one compound selected from the compounds represented by formulas (2), (3) and (6) as a fourth component:

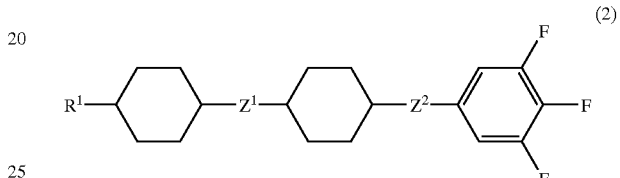
(2)

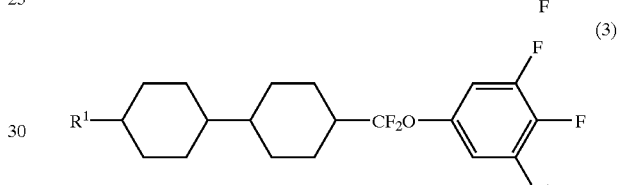
(3)

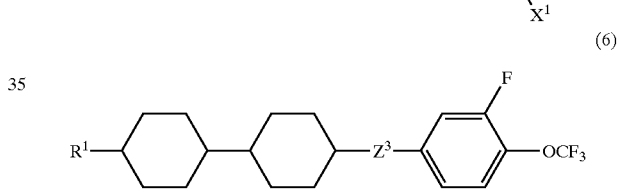
(6)

wherein R¹ represents alkyl; X¹ represents hydrogen or fluorine; Z¹ and Z² each independently represents a single bond or —(CH₂)₂—; and Z³ represents a single bond or —CF₂O—.

10. The liquid crystal composition according to claim 8 which further comprises at least one compound selected from the compounds represented by formulas (2), (3) and (6) as a fourth component:

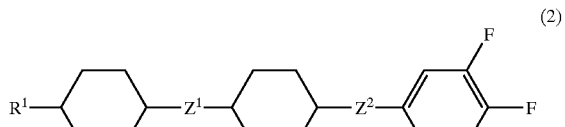
(2)

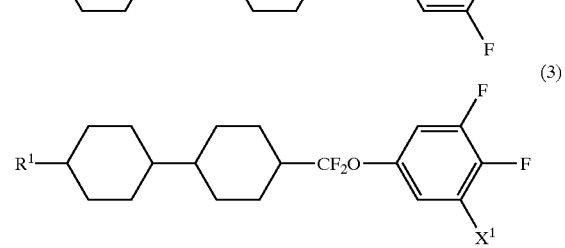
(3)

(6)

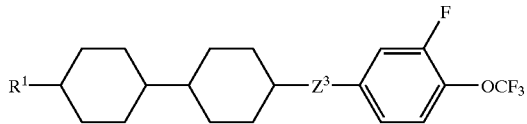

wherein $R^1$ represents alkyl; $X^1$ represents hydrogen or fluorine; $Z^1$ and $Z^2$ each independently represents a single bond or —$(CH_2)_2$—; and $Z^3$ represents a single bond or —$CF_2O$—.

11. The liquid crystal composition according to claim 9 which contains from 10 to 50% by weight of the fourth component, based on the total weight of the composition.

12. The liquid crystal composition according to claim 10 which contains from 10 to 50% by weight of the fourth component, based on the total weight of the composition.

13. A liquid crystal display element which comprises a liquid crystal composition described in claim 1.

14. A liquid crystal display element which comprises a liquid crystal composition described in claim 2.

15. A liquid crystal display element which comprises a liquid crystal composition described in claim 3.

16. A liquid crystal display element which comprises a liquid crystal composition described in claim 4.

17. A liquid crystal display element which comprises a liquid crystal composition described in claim 5.

18. A liquid crystal display element which comprises a liquid crystal composition described in claim 6.

19. A liquid crystal display element which comprises a liquid crystal composition described in claim 7.

20. A liquid crystal display element which comprises a liquid crystal composition described in claim 8.

21. A liquid crystal display element which comprises a liquid crystal composition described in claim 9.

22. A liquid crystal display element which comprises a liquid crystal composition described in claim 10.

23. A liquid crystal display element which comprises a liquid crystal composition described in claim 11.

24. A liquid crystal display element which comprises a liquid crystal composition described in claim 12.

* * * * *